July 13, 1948.                R. F. POUILLE                2,445,081
          HYDRAULIC DEVICE FOR CONTROLLING SEVERAL MEMBERS
            WITH A PREDETERMINED AUTOMATIC INTERDEPENDENCY
Filed Oct. 30, 1946                              5 Sheets-Sheet 1
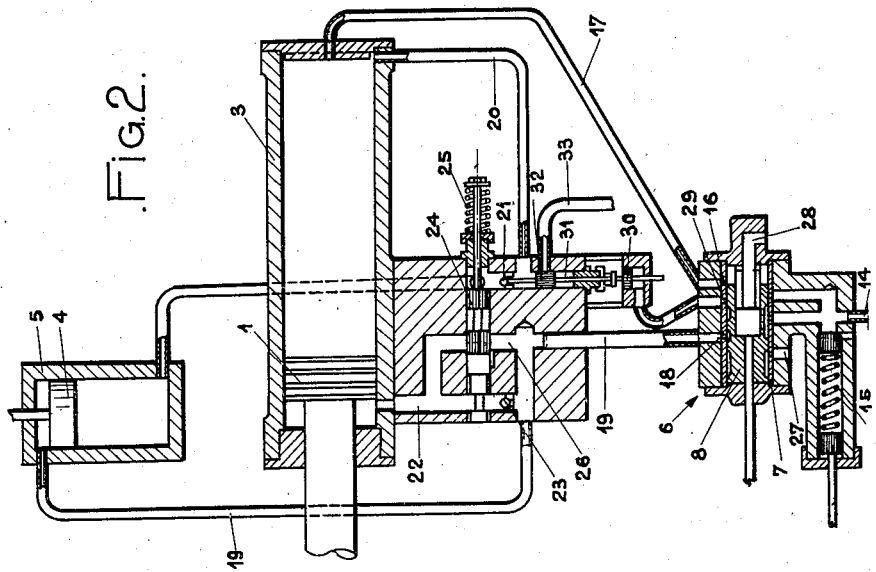
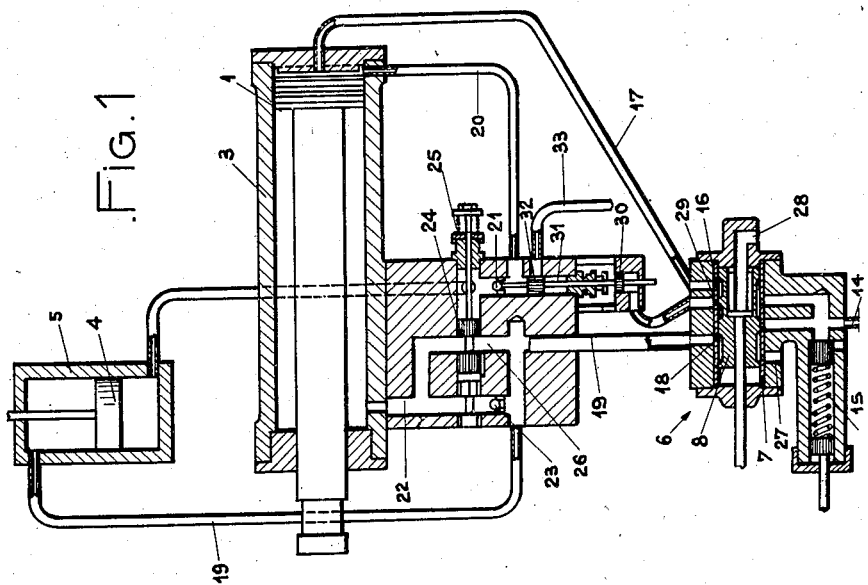
Inventor
Robert F. Pouille
by Wilkinson & Mawhinney
Attorneys July 13, 1948.    R. F. POUILLE    2,445,081
HYDRAULIC DEVICE FOR CONTROLLING SEVERAL MEMBERS
WITH A PREDETERMINED AUTOMATIC INTERDEPENDENCY
Filed Oct. 30, 1946    5 Sheets-Sheet 2
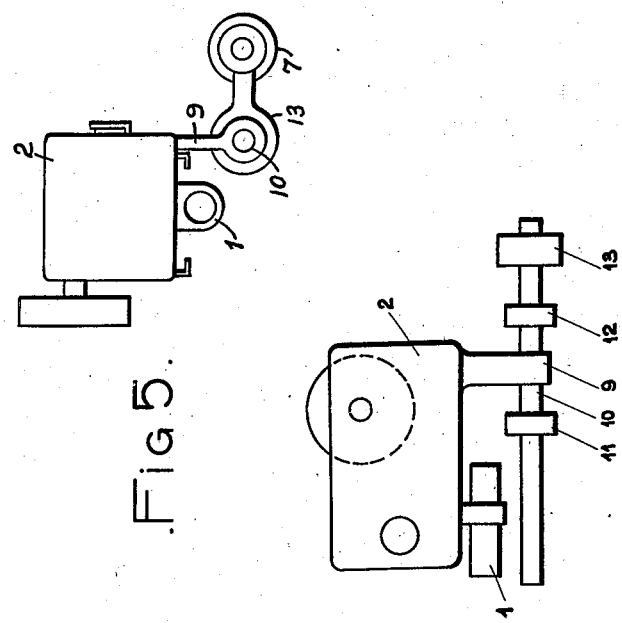
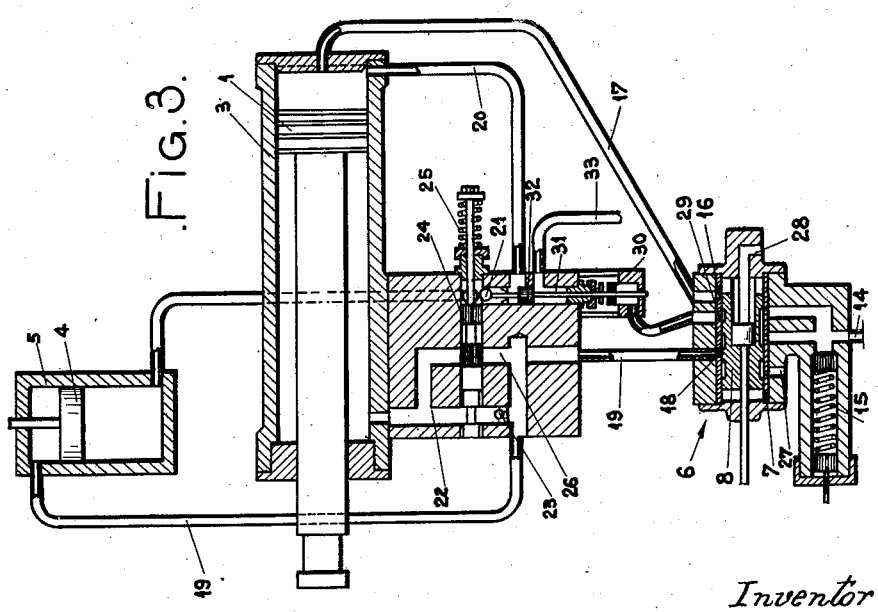
Inventor
Robert F. Pouille
by Wilkinson & Mawhinney
Attorneys July 13, 1948. R. F. POUILLE 2,445,081
HYDRAULIC DEVICE FOR CONTROLLING SEVERAL MEMBERS
WITH A PREDETERMINED AUTOMATIC INTERDEPENDENCY
Filed Oct. 30, 1946 5 Sheets-Sheet 3

Inventor
Robert F. Pouille
by Wilkinson & Mawhinney
Attorneys

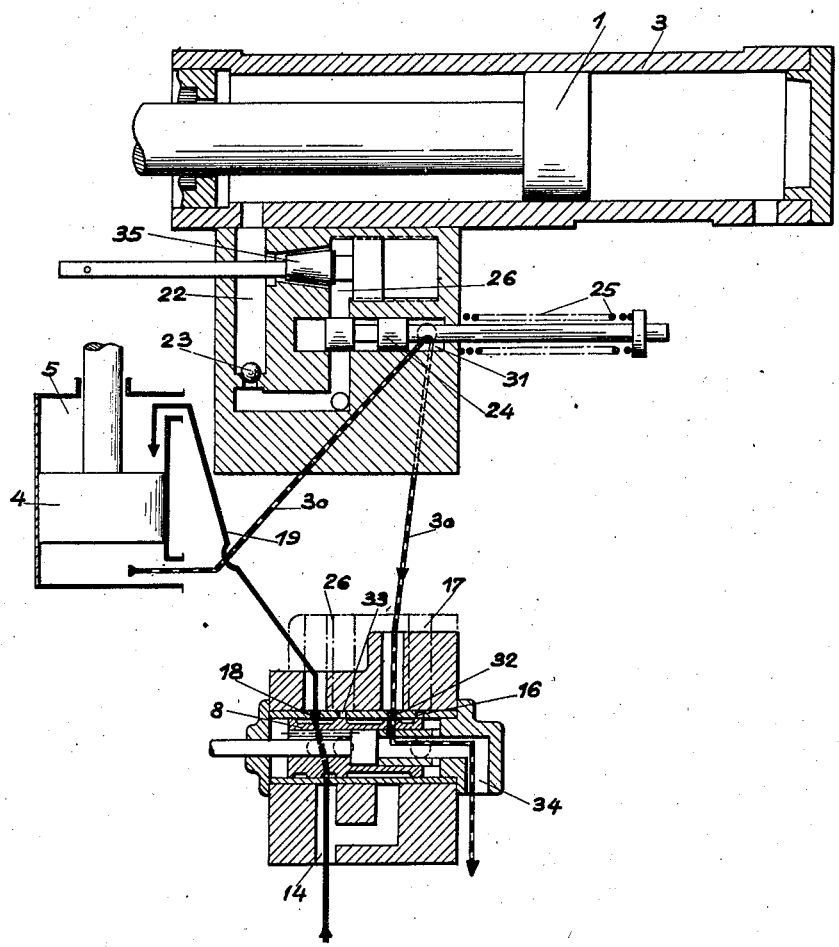

Patented July 13, 1948

2,445,081

UNITED STATES PATENT OFFICE 2,445,081

HYDRAULIC DEVICE FOR CONTROLLING SEVERAL MEMBERS WITH A PREDETERMINED AUTOMATIC INTERDEPENDENCY

Robert François Pouille, Armentieres, France

Application October 30, 1946, Serial No. 706,714
In France October 11, 1940

Section 1, Public Law 690, August 8, 1946
Patent expires October 11, 1960

3 Claims. (Cl. 60—97)

This invention relates to a hydraulic unit for driving several members, such as machine tool members, for example.

In some cases, the operation of several members has to be carried out in a given order and in accordance with a given relation. For instance, machine tools are provided on the one hand, with a tool slide having a reciprocating motion and, on the other hand, with a clamping member which is brought to an operating position for clamping the work before the beginning of the forward stroke of the tool slide and remains in this clamping position during the forward and return strokes of said tool slide, to be returned to its position of rest when said tool slide has been brought to a stop.

The device which is the object of this invention permits carrying out automatically and solely by means of pressure fluid the control of all such or similar motions, with the aforesaid or any other predetermined interdependency. This device is essentially characterized by the combination of two double action hydraulic pistons arranged to drive respectively the two members to be controlled, with a main sliding valve controlling the inlet of fluid under pressure into the cylinders containing said pistons and the exhaust thereof, and additional means also controlling the flow of fluid in connecting conduits so as to cause said pistons to operate only in accordance with the desired interdependency.

The main slide valve is operated by one of the pistons at the end of each successive stroke thereof.

The inlet and exhaust conduits of both cylinders are arranged, and fluid flow regulating valves are provided in one or more of said conduits, in such a manner that the forward and (or) return speeds of either of the pistons or both may be adjusted independently of each other.

For the particular application of the present device to a machine in which there are two members to be controlled one of which is operated by the first piston and must effect its forward and return strokes during the period of rest of the other member between its two strokes, the slide valve first controls a conduit which is connected in series with the working chambers (forward stroke) of the first and second cylinders and then controls a conduit which is connected, on the one hand, with the exhaust chamber (forward stroke) of the second cylinder and, on the other hand, through a branch conduit, with the corresponding chamber of the first cylinder.

In said branch conduit is inserted a ball valve which, while the slide valve is in its first position, causing the first conduit to be connected with the supply of fluid under pressure and the second conduit to be connected with the exhaust, closes said branch conduit and prevents the exhaust from the first cylinder, so that only the second piston effects its forward stroke.

Said ball valve is short-circuited by a by-pass conduit containing an auxiliary slide valve which opens automatically as soon as, on account of the first piston remaining at rest, the pressure rises to an amount limited by a regulating valve, thus permitting the first piston to effect its forward stroke, at the end of which it brings the main slide valve to a second position in which the first conduit is connected with the exhaust while the second is connected with the fluid supply.

For this second position, the exhaust from the first cylinder is freely effected through the first-mentioned conduit and the first piston effects its return stroke, while the second piston still remains at rest since the exhaust from the cylinder is prevented by a ball valve arranged in a portion of conduit that connects the two cylinders together.

At the end of the return stroke, the first piston shifts the main slide valve to a third position in which said valve closes the supply to the cylinders but opens a port allowing the fluid to enter into a small cylinder, the piston of which controls the aforesaid ball valve, which then permits the exhaust from the second cylinder and the return stroke of the second piston.

The instant at which this return stroke is to begin may be varied by varying the position of the aforesaid port.

Other features and details of this invention will be further explained in the following description given with reference to the accompanying drawings showing, in a diagrammatical manner and solely as an example, an embodiment of this invention.

In these drawings:

Fig. 1 is an elevational view showing diagrammatically the hydraulic unit according to this invention in one of its operating positions.

Figs. 2 and 3 are similar views showing said unit in two other positions.

Fig. 4 shows in a diagrammatical manner an example of embodiment of the kinematic driving connection of the main control valve.

Fig. 5 is a corresponding side view of Fig. 4.

Figs. 6 to 8 show another embodiment of the unit in three different positions.

Figure 6:
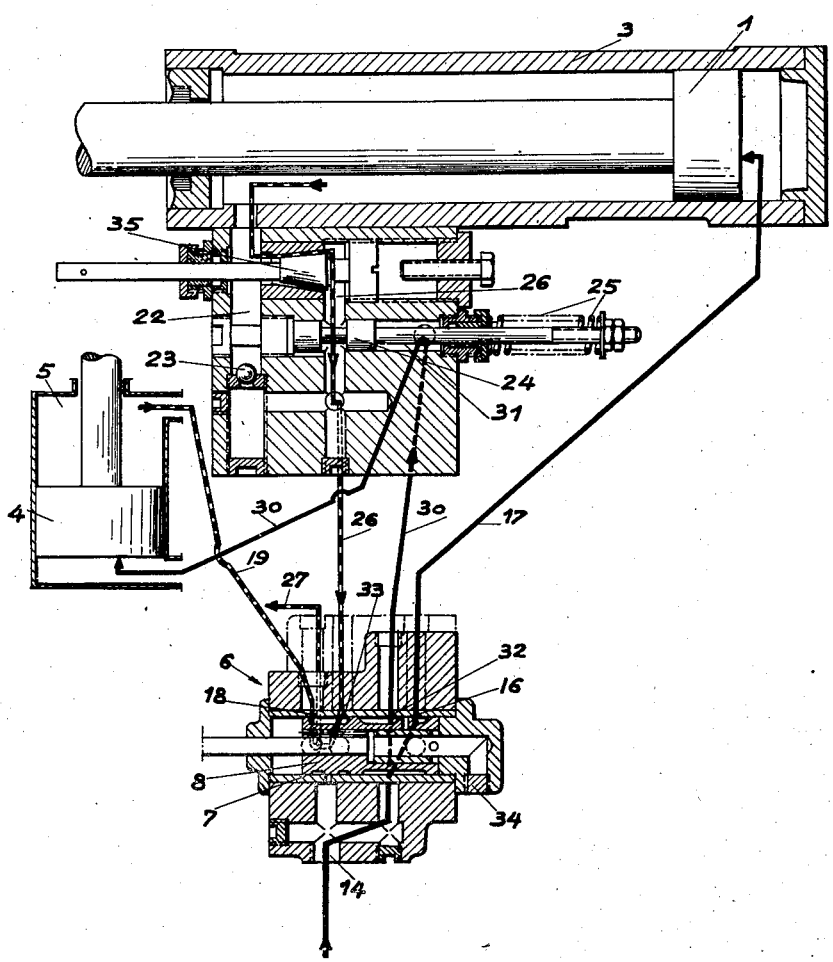

The hydraulic unit according to the embodiment shown is assumed to be applied to a machine-tool the sliding tool carrier of which is driven by fluid pressure with a fast return motion; the piece of work to be machined being itself clamped by fluid pressure. The invention is not limited by this example of application, as obviously it may also be applied to any other purpose.

In view of this particular purpose, the hydraulic unit comprises a first piston 1 driving the tool slide 2 (see Fig. 4); this piston 1 moves in a cylinder 3. A second piston 4, moving in a cylinder 5, effects the clamping and release of the work. The control of the flow of liquid in the cylinders 3 and 5 is effected by a main control slide valve 6, in such a manner that the piston 1 effects both its working and return strokes during the period of rest, of piston 4, i. e. between the end of its upward stroke and the beginning of its downward stroke, in order that the tool operates on the work only when the latter is clamped in a fixed position.

Said controlling valve comprises a casing 7, in which moves the slide valve proper 8, controlled by the piston 1 (or the tool slide 2) through any suitable mechanical connection, of which an embodiment is shown as an example in Figs. 4 and 5. Integrally connected with the tool slide 2 is a lug 9, freely sliding on a rod 10 between collars 11 and 12 which are adjustably secured thereto. At the end of its strokes in either direction, the tool slide 2 thus shifts the rod 10, which in turn shifts the slide valve 8 either directly or, as shown, through an arm 13, fastened to said rod 10 and connected at its opposite end with the stem of slide valve 8.

The control valve casing 7 is supplied with liquid under pressure through a conduit 14 having a pressure controlling valve 15. On the other hand said casing 7 may be connected with the cylinders 3 and 5 through a number of ports and ducts controlled by the slide valve 8 and whose function will now be described.

When starting a cycle of operations, piston 1 is in its extreme right-hand position, piston 4 in its low position and slide valve 8, in the position shown in Fig. 1. In this position, said slide valve uncovers the port 16, connected by a conduit 17 with cylinder 3, and the port 18, connected by a conduit 19 with the upper part of cylinder 5. The right-hand end of cylinder 3 communicates, on the other hand, with the lower part of cylinder 5 through a conduit 20 in which is arranged a ball valve 21. A conduit 22 containing a ball valve 23 connects the left-hand end of cylinder 3 with said conduit 19.

The fluid entering, in the aforesaid position of slide valve 8, into the right-hand end of cylinder 3, flows through the conduit 20 into the cylinder 5 by lifting the ball 21. It thus causes the elevation of piston 4, since exhaust of the fluid out of the upper part of cylinder 5 is freely permitted through conduit 19, uncovered port 18 and an outlet duct 27, whereas, during this upward movement of piston 4, piston 1 remains at rest since escape of the fluid out of the left-hand chamber of cylinder 3 is prevented by the ball valve 23.

When the upward motion of piston 4 is ended, the pressure rises until the regulating valve 15 operates to limit same. At this time, said pressure is sufficient to cause the shifting of an auxiliary slide valve 24, provided with an adjustable spring 25, to bring said slide valve to the position shown in Fig. 1, in which it opens a by-pass conduit 26 short-circuiting the ball valve 23. Escape of the fluid out of the left-hand end of cylinder 3 is then freely permitted and piston 1 effects its stroke toward the left, thus driving the tool slide 2.

When piston 1 reaches the end of its stroke, the lug 9 of the tool slide 2 shifts the rod 10 and brings the slide valve 8 to the position shown in Fig. 2. Fluid under pressure flows through port 18 and conduit 19 into the upper part of cylinder 5 and also flows through conduit 22, by raising the ball valve 23 therein, into the left-hand end of cylinder 3, the slide valve 24 having returned to its closing position. In spite of the fluid acting upon its upper face, piston 4 remains at rest since escaping of fluid out of the lower chamber is prevented by the ball valve 21. On the other hand, piston 1 effects its return stroke since escaping of fluid is freely permitted through conduit 17, port 16 and duct 28. As the piston 1 reaches the end of its stroke, the lug 9 shifts the slide valve 8 and brings it into the position of Fig. 3, in which neither of the cylinder chambers is supplied with liquid. Just before reaching the end of said return stroke, however, the slide valve 8 opens a port 29, which causes the fluid under pressure to raise a piston 30, the stem 31 of which raises the ball 21, thus permitting the fluid to escape out of cylinder 5, through a conduit 33, and causing the downward motion of piston 4. The stem 31 is provided with an enlargement 32 which is however provided with longitudinal ducts for allowing the flow of liquid.

In accordance with the position of the port 29, the downward motion of piston 4 will be effected at a more or less advanced time and, at the limit, exactly when piston 1 comes to rest. There is thus obtained a forward and return drive of piston 1, i. e. of the tool slide, during the period of rest of piston 4 effecting the clamping of the work. In view of another operating cycle, the slide valve 8 may be returned by hand to the position of Fig. 1.

In accordance with this invention, there may be provided in the conduits one or more regulating valves which, on account of the arrangement of said conduits and the provision of ball valves 21, 23, permits of regulating the speed of either of the pistons or both, in one or both direction.

The possibility of regulating the speed in one direction with constant speed may be of advantage for some purposes such as, for example, in fast return machine-tools.

Thus, if it be desired to regulate only the speed of the forward stroke of piston 1, for example, a single regulating valve may be arranged in the conduit 22. Adjusting the speed of flow of the escaping fluid by means of this valve, which may be of any suitable type, will thereby cause the speed of the forward stroke of piston 1 to be also adjusted.

If it is desired, in view of other applications, to regulate also the speed of the return stroke of the same piston and that of piston 4, similar regulating valves may be arranged in the corresponding conduits.

There is thus provided, in accordance with the invention, a hydraulic unit enabling the drive of several members of machine-tools to be effected with a determined interdependency and with the possibility of effecting independent adjusting of the forward and return speeds of these various members, the fluid alone ensuring not only the control of these members, but also the interdependency of their movements.

With a view to obtaining other combinations of motions the pipings may be arranged in a different manner, the principle of the device remaining the same.

In the embodiment just described, the oil under pressure having to act on the piston 4 to cause clamping of the work, is led into the cylinder 5, flowing first through the cylinder 1 and, then, through a conduit 20 containing a ball valve 21 which is automatically lifted for admitting the oil; on the contrary, in the direction of the oil exhaust, which permits unclamping of the work, the ball 21 is held tightly closed, and said exhaust can only be effected when, as the piston 1 is approaching the end of its return stroke, the slide 8 uncovers a port 29 through which the oil under pressure flows then into a small subsidiary cylinder, where it acts on a piston 30 lifting the ball 21 and opening the conduit 20.

Figure 7:
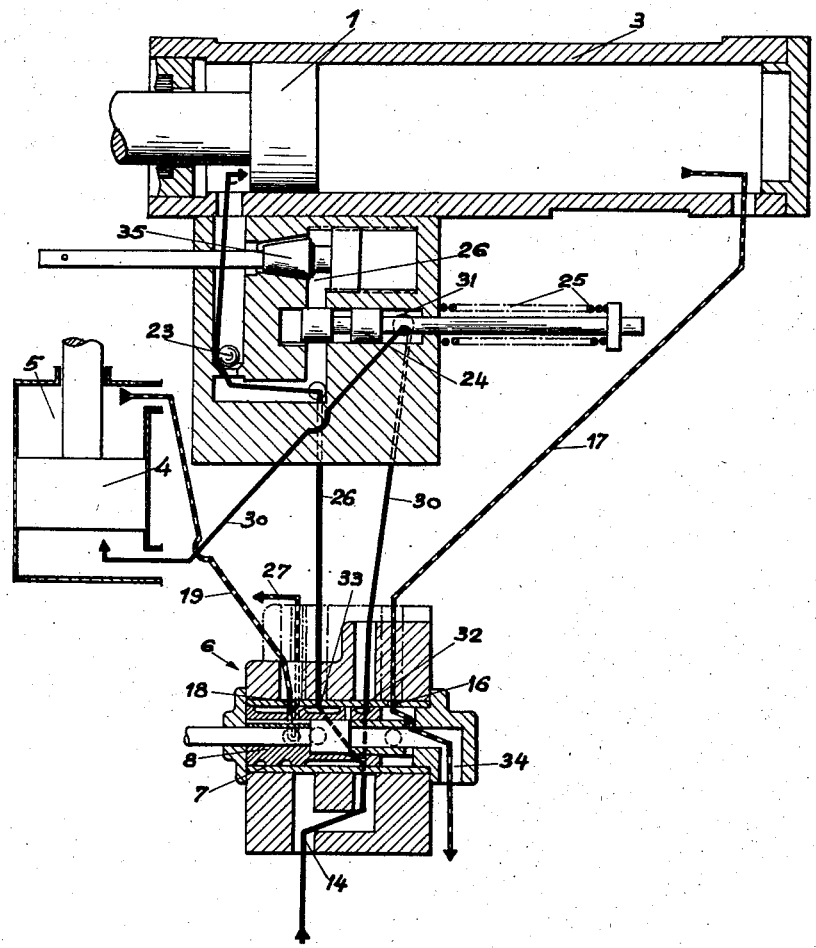

The embodiment according to Figs. 6 to 8 is much simpler, whilst safer in operation; moreover, it absolutely prevents any unclamping of the work all the time the piston 1 keeps moving and, conversely, it allows movement of said piston 1 only when said work is being firmly clamped by the piston 4.

With a view to making the drawings clearer, the conduits for the liquid have not been shown; they have simply been diagrammatically indicated in heavy lines, these being either continuous, when the liquid flowing therethrough is under pressure, or interrupted by blanks, when the conduits are connected to the exhaust.

In accordance with this embodiment, the end of the cylinder 5 into which oil under pressure is to be admitted, is connected to the control valve 6 through a conduit 30 free from any sealing ball; however, as in the construction above described, the oil passing through said conduit flows in the subsidiary cylinder 31 in order to act on the piston valve 24. The opposite end of the cylinder 5 is directly connected with the control valve 6 by a conduit 19. The ports in the casing 7 and in the slide valve 8 of said control valve are then arranged in such a manner that, in all the slide valve positions ensuring the supply of the cylinder 3 with oil under pressure, such oil will also be allowed to enter the appropriate end of the cylinder 5, so as to maintain the piston 4 in the work clamping position, whereas, when the piston 1 is stopped, oil under pressure will be allowed to enter the opposite end of said cylinder 5, so as to cause unclamping of the work.

This embodiment operates as follows:

When starting, the various members are in the position shown in Fig. 6, however, with this difference that the piston-valve 24 is held by its spring 25 in its extreme right-hand position (as shown in Figs. 7 and 8), in which it closes the pipe 26. The slide valve 8 is in its extreme right-hand position, in which its ports 16 and 32 connect the conduits 17 and 30 with the inlet conduit 14 for oil under pressure, while its ports 18 and 33 respectively connect the conduits 19 and 26 with the exhaust conduit 27. In this position, oil under pressure will thus act simultaneously on the right side of the piston 1 and the lower side of the piston 4. The piston 1 remains at rest, however, since the oil contained in the left hand space of the cylinder 3 cannot be discharged either by the pipe 22, or by the pipe 26, as these are closed by the ball valve 23 and the piston-valve 24, respectively. On the other hand, the piston 4 will start on its upward stroke, thus causing clamping of the work. When the work has thus been clamped, the piston 4 is stopped and the pressure of the oil in the pipe 30 and in the cylinder 31 rises to a given value when said pressure is sufficiently high to cause shifting of the piston valve 24 leftwards and to bring the same to the position shown in Fig. 6. In this position said piston valve 24 opens the conduit 26, so that the oil may freely escape from the cylinder 3, which permits of the piston 1 effecting its feeding stroke leftwards, thus producing the motion of the tool (for example a circular saw) in order to machine the work.

When the piston 1 has completed its forward stroke, it causes, by any suitable means (for instance, similar to those shown in Figs. 1 to 5) shifting of the slide valve 8, which it brings to its extreme left-hand position, shown in Fig. 7. In this position, the port 16 causes the conduit 17 to communicate with the exhaust conduit 34, instead of connecting the same with the inlet conduit 14 for oil under pressure as was formerly the case; however, the port 32 still connects the conduit 30 with said inlet conduit 14, so that oil under pressure still acts on the lower side of the piston 4, which still maintains the work in the clamping position. On the other hand, the conduit 26 instead of being connected by the port 33 with the exhaust conduit 27 is now connected by said port with the inlet conduit 14, so that the oil under pressure will now act by lifting the ball valve 23 on the left side of piston 1. This piston is then free to start on its return stroke since oil may freely escape from the cylinder 3 through the conduit 17.

When said piston 1 has completed its return stroke, it causes again shifting of the slide valve 8 in the opposite direction, bringing said valve to the position shown in Fig. 8, in which the ports 16 and 33, respectively corresponding to conduits 17 and 26, are closed. In this same position of the slide valve 8, the port 32 connects the conduit 30 with the exhaust conduit 34, while the port 18 connects the conduit 19 with the inlet pipe 14 for oil under pressure. Under these conditions, the said oil under pressure acts on the upper side of piston 4 and it is thus enabled to control the downward movement of said piston since the oil contained in the lower space of cylinder 5 may freely escape by way of conduit 30. Said piston 4 consequently causes unclamping of the work.

In view of a new cycle of operations, the slide valve 8 only requires to be returned to its starting position, shown in Fig. 6, either by hand or in any other suitable manner, automatically or not.

It will be seen from the preceding description that the device of this invention ensures clamping of the work as long as the piston 1 is moving, i. e. as long as the tool is shifted relatively to said work. Only when said tool is completely stopped, will unclamping of the work be automatically effected. Conversely, as in connection with the former constructional embodiment, the piston 1 can only be shifted when the work is firmly clamped by piston 4.

It will be further noted that, as is provided in the preceding construction, the regulation of the feed speed is obtained by means of a control cock 35 inserted in the exhaust conduit 26. Owing to this arrangement, there is no throttling of the fluid under pressure; moreover, the rearward motion can be effected at a high speed since escape of oil, as a result of this motion, takes place through conduit 17, which comprises no throttling member.

I claim:

1. Hydraulic device for the control of two members one of which has to carry out its forward and return strokes during stoppage of the other, comprising a first piston moving in a first cylinder and controlling the first member, a second piston moving in a second cylinder and controlling the second member, a slide valve controlling, in the first place, a conduit connected in series with the two working chambers (forward stroke) of the first and of the second cylinder and, in the second place, a conduit connected to the exhaust chamber (forward stroke) of the second cylinder, and a branch conduit connecting the last named conduit with the exhaust chamber of the first cylinder, a ball valve being interposed in said branch conduit so that when the slide valve occupies its first position in which it connects the first conduit with the supply of fluid under pressure and the second conduit with the exhaust, said ball valve closes said branch conduit and prevents exhaust from the first cylinder so that alone the second piston effects its forward stroke.

2. Device according to claim 1, in which said ball valve is short-circuited by a by-pass conduit containing an auxiliary slide valve which opens automatically as soon as, on account of the first piston remaining at rest, the pressure rises to an amount limited by a regulating valve, thus permitting the first piston to effect its forward stroke, at the end of which it brings the slide valve to a second position in which the first conduit is connected with the exhaust and the second with the fluid supply, the exhaust from the first cylinder being then freely effected through the first named conduit, thus allowing the first piston to carry out its return stroke whilst the second piston always remains stationary as a result of the exhaust from its cylinder being prevented by a ball valve interposed in the portion of conduit connecting the two cylinders together, said ball valve being brought into the position of opening as soon as the first piston, having reached the end of its return stroke, has brought the slide valve into a third position in which it cuts off the admission to the cylinders but uncovers a port enabling the fluid to flow into a small cylinder whose piston controls said ball valve, the second piston being then able to carry out its return stroke.

3. Hydraulic device for machine tools enabling the tool and the work clamping member to be controlled in such a manner that the tool carries out its forward and return stroke during the time when the clamping member is in the locked position, which member may only return to its position of rest after the end of the return stroke of the work, comprising a first piston moving in a first cylinder controlling the tool, a second piston moving in a second cylinder and controlling the clamping member, a controlling valve, two conduits connecting the controlling valve with the work chambers (forward stroke) of the two cylinders, two conduits connecting said controlling valve with the exhaust chambers (forward stroke) of said two cylinders, and a slide-valve controlled by the pressure prevailing in the inlet conduit for the second cylinder and which governs the exhaust conduit of the first cylinder, the said controlling valve comprising a special port which only connects the exhaust conduit (return stroke) of the second cylinder with the exhaust port when the first piston has completed its return stroke and has brought this slide valve into the required position.

ROBERT FRANÇOIS POUILLE.

REFERENCES CITED

The following references are of record in the file of this patent:

UNITED STATES PATENTS

| Number | Name | Date |
|---|---|---|
| 1,677,860 | Ferris | July 17, 1928 |
| 1,930,155 | Wiedmann | Oct. 10, 1933 |

FOREIGN PATENTS

| Number | Country | Date |
|---|---|---|
| 489,791 | Great Britain | Aug. 4, 1938 |